United States Patent
Kita et al.

(10) Patent No.: US 8,648,152 B2
(45) Date of Patent: Feb. 11, 2014

(54) POLYFUNCTIONAL DIMETHYLNAPHTHALENE FORMALDEHYDE RESIN, AND PROCESS FOR PRODUCTION THEREOF

(75) Inventors: Seiji Kita, Okayama (JP); Masashi Ogiwara, Okayama (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 406 days.

(21) Appl. No.: 12/743,157

(22) PCT Filed: Nov. 11, 2008

(86) PCT No.: PCT/JP2008/070498
§ 371 (c)(1),
(2), (4) Date: Aug. 30, 2010

(87) PCT Pub. No.: WO2009/063860
PCT Pub. Date: May 22, 2009

(65) Prior Publication Data
US 2010/0324255 A1    Dec. 23, 2010

(30) Foreign Application Priority Data

Nov. 16, 2007   (JP) .................. 2007-298110
Dec. 7, 2007    (JP) .................. 2007-317102

(51) Int. Cl.
*C08F 283/00*    (2006.01)
*C08G 10/02*    (2006.01)

(52) U.S. Cl.
USPC ........................................ 525/472

(58) Field of Classification Search
USPC ........................................ 525/472
See application file for complete search history.

(56) References Cited

U.S. PATENT DOCUMENTS

| | | | |
|---|---|---|---|
| 2,597,159 A | 5/1952 | May et al. | |
| 3,178,393 A | 4/1965 | Brandt et al. | |
| 3,453,220 A | 7/1969 | Vanderwerff | |
| 3,904,687 A * | 9/1975 | Suzuki et al. | 558/4 |
| 4,098,838 A * | 7/1978 | Grigoleit et al. | 549/49 |
| 4,214,872 A | 7/1980 | Uhrig et al. | |
| 6,664,433 B1 * | 12/2003 | Senzaki et al. | 585/864 |
| 2004/0266976 A1 | 12/2004 | Senzaki et al. | |

FOREIGN PATENT DOCUMENTS

| | | |
|---|---|---|
| JP | 48 14792 | 5/1973 |
| JP | 54 86593 | 7/1979 |
| JP | 61 228013 | 10/1986 |
| JP | 63097614 | 4/1988 |
| JP | 02 134332 | 5/1990 |
| JP | 07 053653 | 2/1995 |
| JP | 07 258519 | 10/1995 |
| JP | 11 92543 | 4/1999 |
| JP | 2006-070000 | 3/2006 |
| WO | 2003 055927 | 7/2003 |

OTHER PUBLICATIONS

Machine Translation of JP 11-092543.*
U.S. Appl. No. 13/423,962, filed Mar. 19, 2012, Kita, et al.
U.S. Appl. No. 13/423,996, filed Mar. 19, 2012, Kita, et al.
U.S. Appl. No. 12/746,611, filed Jun. 7, 2010, Kita, et al.
Nemoto, T. et al., "Synthesis And Properties Of Organosoluble Poly (Phenylenemethylene)s From Substituted Benzenes Or Naphthalenes", Polymer Journal, vol. 38, No. 12, pp. 1278-1282 (Dec. 15, 2006).
Extended European Search Report issued Feb. 8, 2012, in Patent Application No. 08848623.8.
Office Action in Taiwanese Patent Application No. 097143780 filed Nov. 13, 2008.

* cited by examiner

*Primary Examiner* — Mike M Dollinger
(74) *Attorney, Agent, or Firm* — Oblon, Spivak, McClelland, Maier & Neustadt, L.L.P.

(57) ABSTRACT

The present invention provides a polyfunctional dimethylnaphthalene formaldehyde resin which is polyfunctional, rich in reactivity and useful as a variety of raw materials to be modified, specifically a dimethylnaphthalene formaldehyde resin obtained by allowing (1) one kind or two or more kinds of a dimethylnaphthalene having one methyl group on each of two benzene rings in a naphthalene ring thereof and selected from the group consisting of 1,5-dimethylnaphthalene, 1,6-dimethylnaphthalene, 2,6-dimethylnaphthalene, 1,7-dimethylnaphthalene, 1,8-dimethylnaphthalene and 2,7-dimethylnaphthalene; and (2) formaldehyde to react with each other in the presence of water and an acid catalyst, the polyfunctional dimethylnaphthalene formaldehyde resin having a mean value of the number of hydrogen atoms substituted by the reaction among the six hydrogen atoms directly bonded on the naphthalene ring in the dimethylnaphthalene of from 1.8 to 3.5.

22 Claims, No Drawings

POLYFUNCTIONAL DIMETHYLNAPHTHALENE FORMALDEHYDE RESIN, AND PROCESS FOR PRODUCTION THEREOF

TECHNICAL FIELD

The present invention relates to a polyfunctional dimethylnaphthalene formaldehyde resin which is useful as a variety of raw materials to be modified and to a method for producing the same. The polyfunctional dimethylnaphthalene formaldehyde resin of the present invention can be used for widespread applications such as an electrical insulating material, a resin for resist, a semiconductor sealing resin, an adhesive for printed wiring board, a matrix resin for electrical laminate or prepreg to be mounted in electrical instruments, electronic instruments, industrial instruments, etc., a buildup laminate material, a resin for fiber-reinforced plastic, a sealing resin for liquid crystal display panel, a paint, a variety of coating agents, an adhesive and the like upon being modified with phenols such as phenol, naphthol, etc. or a polyol.

BACKGROUND ART

It has been well known from old that a monocyclic aromatic hydrocarbon formaldehyde resin is obtained by allowing a monocyclic aromatic hydrocarbon such as xylene, etc. and formaldehyde to react with each other in the presence of an acid catalyst such as sulfuric acid, etc. (see, for example, Non-Patent Document 1). Also, it has been known that a polycyclic aromatic hydrocarbon formaldehyde resin is obtained from formaldehyde as well as a dimethylnaphthalene isomer mixture or a mixture of a dimethylnaphthalene isomer mixture and methylnaphthalene (see, for example, Patent Document 1).

In recent years, because of an increase of awareness concerning the environment, there is desired a material which is rich in flame retardancy even without using a phosphorus based flame retardant or a bromine based flame retardant. In connection therewith, it is carried out to introduce a polycyclic aromatic skeleton into a resin serving as a raw material. However, in general, since a polycyclic aromatic compound such as naphthalene, etc. is obtained from cokes such as coal, etc., undesirable impurities such as a sulfur-containing compound, a nitrogen-containing compound, etc. are incorporated thereinto. Thus, the incorporation of a sulfur compound or a nitrogen-containing compound into a resin which is obtained using it as a raw material is unavoidable.

Also, though there may be the case where an aromatic hydrocarbon formaldehyde resin is used as it is, in order to use it for a variety of applications such as an application for thermosetting resin material, etc., in many cases, the aromatic hydrocarbon formaldehyde resin is further subjected to a modification reaction with phenols, carboxylic acids, polyols, etc. For that reason, the resin is preferably a polyfunctional resin. Here, among hydrogen atoms directly bonded on an aromatic ring of an aromatic hydrocarbon as a raw material of the resin, a mean value of the number of hydrogen atoms substituted by a reaction during the production of a resin (a mean value of the number of substituted hydrogen atoms per one aromatic ring) can be utilized as an index showing polyfunctionality of the resin. In measuring the obtained resin by means of $^1$H-NMR, in the case where a xylene is used as a raw material, the mean number of substituted hydrogen atoms means a numerical value calculated utilizing an integrated value of methyl protons in the vicinity of from 1.8 to 2.6 ppm and an integrated value of protons directly bonded on the aromatic ring in the vicinity of 6.9 ppm; and in the case where a methylnaphthalene based compound is used as a raw material, the mean number of substituted hydrogen atoms means a numerical value calculated utilizing an integrated value of methyl protons in the vicinity of from 2.3 to 3.2 ppm and an integrated value of protons directly bonded on the aromatic ring in the vicinity of from 6.8 to 8.2 ppm.

However, in the case where naphthalene or monomethylnaphthalene is used as a raw material, it is difficult to obtain a polyfunctional naphthalene formaldehyde resin by a usual method so that it was necessary to perform a special reaction such as an interface reaction (see Patent Documents 2 and 3). Also, even in the case where a dimethylnaphthalene is used as a raw material, it has become clear that there may be the case where a polyfunctional resin is not obtained.

[Non-Patent Document 1] *Kobunshika* (Polymerization), supervised by IMOTO, Minoru, Kagaku Kogyo K.K., published in February 1966
[Patent Document 1] JP-A-54-86593
[Patent Document 2] JP-A-61-228013
[Patent Document 3] JP-A-11-92543

DISCLOSURE OF THE INVENTION

Problems that the Invention is to Solve

An object of the present invention is to provide a polyfunctional dimethylnaphthalene formaldehyde resin which is polyfunctional and rich in reactivity and in which a content of each of a sulfur atom and a nitrogen atom in the resin is preferably not more than 0.5 ppm.

Means for Solving the Problems

The present inventors made extensive and intensive investigations. As a result, it has been found that a dimethylnaphthalene formaldehyde resin obtained by using, as a raw material naphthalene compound, a dimethylnaphthalene having one methyl group on each of two benzene rings in a naphthalene ring thereof and allowing this to react with formaldehyde in the presence of water and an acid catalyst is able to attain the foregoing object, leading to the present invention.

That is, the present invention is concerned with:
[1] A polyfunctional dimethylnaphthalene formaldehyde resin which is a dimethylnaphthalene formaldehyde resin obtained by allowing (1) one kind or two or more kinds of a dimethylnaphthalene having one methyl group on each of two benzene rings in a naphthalene ring thereof and selected from the group consisting of 1,5-dimethylnaphthalene, 1,6-dimethylnaphthalene, 2,6-dimethylnaphthalene, 1,7-dimethylnaphthalene, 1,8-dimethylnaphthalene and 2,7-dimethylnaphthalene; and (2) formaldehyde to react with each other in the presence of water and an acid catalyst, the polyfunctional dimethylnaphthalene formaldehyde resin having a mean value of the number of hydrogen atoms substituted by the reaction among the six hydrogen atoms directly bonded on the naphthalene ring in the dimethylnaphthalene of from 1.8 to 3.5;
[2] The polyfunctional dimethylnaphthalene formaldehyde resin as set forth above in [1], wherein a use proportion of the components (1) and (2) [component (1)/component (2)] is from 1/1 to 1/6 in terms of a molar ratio;
[3] The polyfunctional dimethylnaphthalene formaldehyde resin as set forth above in [1] or [2], wherein the acid catalyst is sulfuric acid or p-toluenesulfonic acid;
[4] The polyfunctional dimethylnaphthalene formaldehyde resin as set forth above in [3], wherein a concentration of sulfuric acid in a component composed of formaldehyde, water and sulfuric acid is from 20 to 55% by mass;

[5] The polyfunctional dimethylnaphthalene formaldehyde resin as set forth above in any one of [1] to [4], wherein a concentration of formaldehyde in a component composed of formaldehyde, water and the acid catalyst is from 20 to 40% by mass;

[6] The polyfunctional dimethylnaphthalene formaldehyde resin as set forth above in any one of [1] to [5], obtained by further adding an aliphatic alcohol and allowing it to react in the reaction of the dimethylnaphthalene and formaldehyde;

[7] The polyfunctional dimethylnaphthalene formaldehyde resin as set forth above in [6], wherein the aliphatic alcohol is methanol, ethanol or isopropanol;

[8] The polyfunctional dimethylnaphthalene formaldehyde resin as set forth above in any one of [1] to [7], wherein a content of each of a sulfur atom and a nitrogen atom derived from impurities which are incorporated into the dimethylnaphthalene is not more than 0.5 ppm;

[9] The polyfunctional dimethylnaphthalene formaldehyde resin as set forth above in any one of [1] to [8], having a weight average molecular weight (Mw) of from 200 to 2,000;

[10] A phenols-modified dimethylnaphthalene formaldehyde resin obtained by allowing phenols and the polyfunctional dimethylnaphthalene formaldehyde resin as set forth above in any one of [1] to [9] to react with each other;

[11] The phenols-modified dimethylnaphthalene formaldehyde resin as set forth above in [10], having a weight average molecular weight (Mw) of from 300 to 6,000; and

[12] A method for producing a polyfunctional dimethylnaphthalene formaldehyde resin including (I) a step of obtaining one kind or two or more kinds of a dimethylnaphthalene selected from the group consisting of 1,5-dimethylnaphthalene, 1,6-dimethylnaphthalene, 2,6-dimethylnaphthalene, 1,7-dimethylnaphthalene, 1,8-dimethylnaphthalene and 2,7-dimethylnaphthalene through a chemical synthesis including (A) a step of allowing 1,3-butadiene and o-xylene or p-xylene to react with each other in the presence of a strong alkali catalyst, (B) a step of subsequently cyclizing a reaction product to obtain a tetralin compound and (C) a step of dehydrogenating the tetralin compound to obtain a naphthalene compound, or a chemical synthesis further including (D) a step of isomerizing the naphthalene compound obtained in the step (C); and (II) a step of allowing the dimethylnaphthalene obtained in the step (I) and formaldehyde to react with each other in the presence of water and an acid catalyst, the polyfunctional dimethylnaphthalene formaldehyde resin having a mean value of the number of hydrogen atoms substituted by the reaction among the six hydrogen atoms directly bonded on the naphthalene ring in the dimethylnaphthalene of from 1.8 to 3.5.

Advantages of the Invention

The novel dimethylnaphthalene formaldehyde resin of the present invention is excellent in heat resistance, has polyfunctionality exceeding known naphthalene formaldehyde resins, is rich in reactivity and is useful as raw materials for a variety of modified resins. According to the present invention, it is also possible to provide a dimethylnaphthalene formaldehyde resin in which a content of each of a sulfur atom and a nitrogen atom in the resin is not more than 0.5 ppm.

BEST MODES FOR CARRYING OUT THE INVENTION

[Polyfunctional Dimethylnaphthalene Formaldehyde Resin]

As described previously, the polyfunctional dimethylnaphthalene formaldehyde resin of the present invention is a dimethylnaphthalene formaldehyde resin obtained by allowing (1) one kind or two or more kinds of a dimethylnaphthalene having one methyl group on each of two benzene rings in a naphthalene ring thereof and selected from the group consisting of 1,5-dimethylnaphthalene, 1,6-dimethylnaphthalene, 2,6-dimethylnaphthalene, 1,7-dimethylnaphthalene, 1,8-dimethylnaphthalene and 2,7-dimethylnaphthalene (the dimethylnaphthalene will be hereinafter sometimes referred to as "naphthalene compound"); and (2) formaldehyde to react with each other in the presence of water and an acid catalyst.

(Naphthalene Compound)

In the present invention, the naphthalene compound which is used as a raw material is a dimethylnaphthalene having one methyl group on each of two benzene rings in a naphthalene ring thereof, which is obtained through a chemical synthesis using, as starting raw materials, o-xylene and 1,3-butadiene, or p-xylene and 1,3-butadiene. Specifically, the dimethylnaphthalene includes 1,5-dimethylnaphthalene, 1,6-dimethylnaphthalene, 2,6-dimethylnaphthalene, 1,7-dimethylnaphthalene, 1,8-dimethylnaphthalene and 2,7-dimethylnaphthalene, and these compounds may be used singly or in combinations of two or more kinds thereof. In the dimethylnaphthalene, though 1,5-diethylnaphthalene, 1,6-diethylnaphthalene, 2,6-diethylnaphthalene, 1,7-diethylnaphthalene, 1,8-diethylnaphthalene, 2,7-diethylnaphthalene or the like may be incorporated, a content thereof is preferably not more than 20% by mass, and more preferably not more than 5% by mass relative to the naphthalene compound.

One kind or two or more kinds of the dimethylnaphthalene selected from the group consisting of 1,5-dimethylnaphthalene, 1,6-dimethylnaphthalene and 2,6-dimethylnaphthalene can be obtained by allowing o-xylene and 1,3-butadiene to react with each other in the presence of a strong alkali catalyst to form o-toluyl-1-pentene (step A), subsequently cyclizing the o-toluyl-1-pentene to obtain a tetralin compound (step B) and dehydrogenating the tetralin compound to obtain a naphthalene compound (step C) and optionally, isomerizing the naphthalene compound to obtain a structural isomer (step D), followed by properly subjecting to separation and purification by means of distillation, crystallization or the like.

Also, one kind or two or more kinds of the dimethylnaphthalene selected from the group consisting of 1,7-dimethylnaphthalene, 1,8-dimethylnaphthalene and 2,7-dimethylnaphthalene can be obtained by allowing p-xylene and 1,3-butadiene as starting raw materials to react with each other according to the foregoing steps A to C and optionally, the step D, followed by properly subjecting to separation and purification by means of distillation, crystallization or the like.

As the foregoing steps A to D, known methods, for example, a method disclosed in JP-A-2006-70000 can be utilized. Specific reaction conditions are described below.

(Step A)

In the step A, a use amount of the dimethylnaphthalene is preferably 5 molar times or more, and more preferably 8 molar times or more relative to 1,3-butadiene. A reaction temperature is preferably from about 90 to 200° C., and more preferably from 100 to 180° C. A reaction pressure is preferably from 0.01 to 2 MPa. Also, a reaction time (residence time) is usually from about 0.1 to 10 hours.

As the strong alkali catalyst which is used in the step A, a mixture of sodium and potassium is preferable. In the step A, the desired product (alkenylated compound) can be isolated preferably by quenching a reaction mixed solution by the addition of water, an alcohol or a mixture thereof, followed by a usual isolation measure of organic compounds.

(Step B)

It is preferable that the cyclization reaction of the step B is carried out in the presence of a solid acid catalyst. Examples of the solid acid catalyst include crystalline alumina silicates such as an H type, a Y type, a beta type, an L type, mordenite, etc. Of these, from the viewpoint of selectivity, an H type mordenite having a silica/alumina ratio of from 1 to 100 is preferable.

A temperature of the cyclization reaction is preferably from about 150 to 250° C., and more preferably from 170 to 230° C. A reaction pressure is preferably from about 0.03 to 0.5 MPa. It is also possible to use a diluent for the purpose of performing the cyclization reaction in a vapor phase state. The diluent is not particularly limited so far as it is inert under the foregoing reaction condition and is able to keep the reaction system in a vapor phase state. Examples thereof include gaseous materials such as nitrogen, carbon dioxide, hydrogen, argon, helium, etc.; saturated hydrocarbons such as propane, butane, pentane, hexane, heptane, etc.; alicyclic hydrocarbons such as cyclopentane, cyclohexane, etc.; aromatic hydrocarbons such as benzene, toluene, xylene, etc.; and the like. It is preferable that water is removed from the reaction mixture.

(Step C)

It is preferable that the dehydrogenation of the tetralin compound is carried out in the presence of a catalyst, and examples of the catalyst include a platinum catalyst, a palladium catalyst, a nickel catalyst and a copper catalyst each using active carbon or alumina as a carrier. Of these, a platinum catalyst is preferable, and a platinum catalyst using active carbon as a carrier is more preferable.

A temperature of the dehydrogenation reaction is preferably from about 150 to 350° C., and more preferably from 200 to 300° C. A reaction pressure is preferably from about 0.03 to 0.5 MPa.

(Step D)

In the case where 2,6-dimethylnaphthalene or 2,7-dimethylnaphthalene is necessary, 1,6-dimethylnaphthalene or 1,7-dimethylnaphthalene is isomerized respectively. In the present isomerization reaction, a method in which the isomerization is carried out in a liquid phase using, as a catalyst, a solid catalyst containing alumina and/or silica, preferably mordenite substantially composed of a hydrogen type and having a molar ratio of silica to alumina of 100 or more is preferable. Also, a reaction temperature is preferable not higher than 270° C.

After the isomerization reaction, in the case of 1,7-dimethylnaphthalene, a mixture of the 1,7-isomer and the 2,7-isomer is formed after the isomerization. By performing crystallization utilizing a solvent such as a saturated hydrocarbon, for example, propane, butane, pentane, hexane, heptane, etc., an alicyclic hydrocarbon, for example, cyclopentane, cyclohexane, etc., an aromatic hydrocarbon, for example, benzene, toluene, xylene, etc., and the like, only 2,7-dimethylnaphthalene having a high melting point is obtainable in a high purity. Also, in the case of 1,6-dimethylnaphthalene, a mixture of the 1,6-isomer and the 2,6-isomer is formed after the isomerization. By performing crystallization utilizing a solvent such as a saturated hydrocarbon, an alicyclic hydrocarbon, an aromatic hydrocarbon, etc. in the same manner as described above, only 2,6-dimethylnaphthalene is obtainable in a high purity.

It is preferable that the mother liquor containing a mixture of isomers after the crystallization is again subjected to an isomerization step.

In this way, by producing the naphthalene formaldehyde resin using the dimethylnaphthalene obtained through a chemical synthesis using a xylene (o-xylene or p-xylene) and 1,3-butadiene as starting raw materials in a process including the foregoing steps A to C and optionally, the step D, it is possible to obtain a novel dimethylnaphthalene formaldehyde resin which is polyfunctional and rich in reactivity and in which a content of each of a sulfur atom and a nitrogen atom (all of which are derived from impurities which are incorporated into the dimethylnaphthalene) in the resin is preferably not more than 0.5 ppm.

It is important that the raw material naphthalene compound which is used in the present invention is a dimethylnaphthalene having one methyl group on each of two benzene rings in a naphthalene ring thereof. As a result of extensive and intensive investigations made by the present inventors, it has become clear that in the case of using, as a raw material, one kind or two or more kinds of a dimethylnaphthalene selected from the group consisting of naphthalene which is an unsubstituted compound; a monomethylnaphthalene such as 1-methylnaphthalene, etc.; and 1,2-dimethylnaphthalene, 1,3-dimethylnaphthalene, 1,4-dimethylnaphthalene and 2,3-dimethylnaphthalene each having two methyl groups substituted only on a benzene ring of one side of a naphthalene ring thereof, a polyfunctional naphthalene formaldehyde resin is not obtainable unless a special reaction mode such as an interface reaction is adopted (see, for example, Comparative Examples 1 and 2 of the present specification). Also, in the case of using a naphthalene compound having three or more methyl groups substituted thereon, the number of reactive points with formaldehyde (the number of hydrogen atoms directly bonded on the naphthalene ring) becomes small so that a polyfunctional naphthalene formaldehyde resin could not be obtained.

The "polyfunctionality" which the dimethylnaphthalene formaldehyde of the present invention has means that a mean value of the number of hydrogen atoms substituted by the reaction for producing a dimethylnaphthalene formaldehyde resin among the six hydrogen atoms directly bonded on the naphthalene ring in the dimethylnaphthalene (hereinafter sometimes referred to as "mean value of the number of substituted hydrogen atoms per one naphthalene ring in the dimethylnaphthalene formaldehyde resin") exceeds 1.8.

The mean value of the number of substituted hydrogen atoms per one naphthalene ring in the dimethylnaphthalene formaldehyde resin of the present invention is from 1.8 to 3.5, preferably from 2.0 to 3.5, more preferably from 2.0 to 3.3, and further preferably from 2.5 to 3.0. What the mean value of the number of substituted hydrogen atoms per one naphthalene ring in the resin is less than 1.8 is not preferable because an active group (for example, a methylol group, a methoxymethyl group, etc.) which is rich in reactivity with a third component becomes few so that an acquisition amount of a modified resin obtained by a reaction with the third component is small. In particular, what the mean value of the number of substituted hydrogen atoms is 2.0 or more is preferable because the reactivity with the third component is sufficient. On the other hand, what the mean value of the number of substituted hydrogen atoms per one naphthalene ring in the resin exceeds 3.5 is technically difficult.

Since the dimethylnaphthalene formaldehyde resin obtained by the present invention is polyfunctional, not only it has high reactivity with phenols, carboxylic acids, polyols, etc. each having active hydrogen, but its acquisition amount is large.

(Formaldehyde)

As the formaldehyde, compounds capable of generating formaldehyde, such as formalin, paraformaldehyde, trioxan, etc., all of which are industrially easily available, can be exemplified. In performing a condensation reaction, a molar ratio of the dimethylnaphthalene to formaldehyde is from 1/1 to 1/6, preferably from 1/1.5 to 1/6, more preferably 1/2 to 1/6, further preferably from 1/2.5 to 1/6, and especially preferably from 1/2.5 to 1/5. When the molar ratio of the dimethylnaphthalene to formaldehyde is made to fall within the foregoing range, not only a resin yield of the resulting dimethylnaphthalene formaldehyde resin can be kept relatively high, but an amount of unreacted residual formaldehyde can be made small.

(Production Method of Dimethylnaphthalene Formaldehyde Resin)

The condensation reaction of the naphthalene compound and formaldehyde is carried out in the presence of water and an acid catalyst.

As the acid catalyst, sulfuric acid, p-toluenesulfonic acid and the like are exemplified, but in general, sulfuric acid is suitable. For example, in the case of using sulfuric acid, a use amount of the acid catalyst is adjusted such that a concentration of sulfuric acid in a component composed of formaldehyde, water and sulfuric acid is preferably from 20 to 55% by mass, and more preferably from 25 to 40% by mass. When the concentration of sulfuric acid is made to fall within this range, an appropriate reaction rate is obtainable, and furthermore, it is possible to prevent an increase of the viscosity of the resin to be caused due to a large reaction rate. On the other hand, in the case of using p-toluenesulfonic acid, it is preferable to use p-toluenesulfonic acid so as to adjust its concentration slightly higher than that in the case of using sulfuric acid, for example, a concentration of p-toluenesulfonic acid in a component composed of formaldehyde, water and p-toluenesulfonic acid is adjusted at from 35 to 60% by mass.

Also, a concentration of formaldehyde in a component composed of formaldehyde, water and sulfuric acid in the raw material components is preferably from 20 to 40% by mass. By setting the concentration of formaldehyde to be from 20 to 40% by mass, a reaction rate which is preferable for practical use is obtainable.

The condensation reaction of the naphthalene compound and formaldehyde is usually carried out at atmospheric pressure and carried out while refluxing upon heating at 100° C. as a boiling point of water. However, a reaction temperature may be properly chosen within the range of from ordinary temperature to 100° C., and a reaction pressure may be an elevated pressure of from about 0.001 to 0.02 MPa (gauge pressure). In the case of using, as a raw material, a dimethylnaphthalene having a melting point of 100° C. or higher, for the purpose of setting the reaction temperature to be its melting point or higher, it is preferable that the reaction is carried out under an elevated pressure of from about 0.01 to 0.02 MPa (gauge pressure). Also, if desired, an aromatic hydrocarbon such as ethylbenzene, etc.; or an aliphatic hydrocarbon solvent such as heptane, octane, etc., all of which are inert against the condensation reaction, can be used as a diluting solvent.

In general, a reaction time of the present condensation reaction is preferably from about 4 to 10 hours, and more preferably from 5 to 8 hours. By adopting such a reaction time, the dimethylnaphthalene formaldehyde resin having desired properties is obtainable economically and industrially advantageously.

Also, if desired, the present condensation reaction may be carried out while heat refluxing by the addition of an aliphatic lower alcohol such as methanol, ethanol, isopropanol, etc. By performing the reaction by the addition of an aliphatic lower alcohol, the aliphatic lower alcohol is captured as a terminal group of the dimethylnaphthalene formaldehyde resin, namely a methylol group directly bonded on the naphthalene ring of the repeating unit structure is partially captured as an alkoxy group, thereby enabling one to realize a low molecular weight and to decrease the viscosity.

After the condensation reaction, if desired, by after adding the foregoing diluting solvent, allowing the mixture to stand to cause two-phase separation, separating a resin phase as an oily phase from an aqueous phase, further washing it with water, thereby completely removing the acid catalyst and removing the added diluting solvent and the unreacted raw material dimethylnaphthalene by a general method such as distillation, etc., a polyfunctional dimethylnaphthalene formaldehyde resin having desired properties is obtainable.

(Characteristic Values of Polyfunctional Dimethylnaphthalene Formaldehyde Resin)

A weight average molecular weight (Mw) of the thus obtained polyfunctional dimethylnaphthalene formaldehyde resin is preferably from 200 to 2,000, more preferably from 300 to 1,800, and further preferably from 300 to 1,700; and a degree of dispersion (Mw/Mn) is preferably from 1.1 to 3, and more preferably from 1.1 to 2.8. Also, each of a content of a sulfur atom and a content of a nitrogen atom in the polyfunctional dimethylnaphthalene formaldehyde resin is not more than 0.5 ppm.

Also, it is possible to modify the thus obtained dimethylnaphthalene formaldehyde resin with phenols (a phenol or the like) in the following manners.

[Phenols-Modified Dimethylnaphthalene Formaldehyde Resin]

A phenols-modified dimethylnaphthalene formaldehyde resin is obtained by adding the phenols to the foregoing polyfunctional dimethylnaphthalene formaldehyde resin and subjecting the mixture to a condensation reaction upon heating in the presence of an acid catalyst.

Examples of the phenols include phenol, cresol, 4-t-butylphenol, xylenol, propionylphenol, etc., and these phenols may be used singly or in combinations of two or more kinds thereof.

The condensation reaction of the dimethylnaphthalene formaldehyde resin and the phenols is generally carried out at atmospheric pressure while refluxing upon heating at a melting point or higher. If desired, the condensation reaction can also be carried out under an elevated pressure. Furthermore, if desired, a solvent which is inert to the present condensation reaction can be used. Examples of the solvent include an aromatic hydrocarbon such as ethylbenzene, etc.; a saturated aliphatic hydrocarbon such as heptane, hexane, etc.; an alicyclic hydrocarbon such as cyclohexane, etc.; a ketone such as methyl isobutyl ketone, etc.; an ether such as dioxane, dibutyl ether, etc.; an alcohol such as 2-propanol, etc.; a carboxylic acid ester such as ethyl propionate, etc.; a carboxylic acid such as acetic acid, etc.; and the like. In the case of using the solvent, it is preferable that its use amount is from 1 to 5 times by mass relative to the total sum of the dimethylnaphthalene formaldehyde resin and the phenols.

Examples of the acid catalyst which is used in the present condensation reaction include sulfuric acid, p-toluenesulfonic acid, etc. For example, in the case of using p-toluenesulfonic acid, a use amount of the acid catalyst is adjusted such that a concentration of p-toluenesulfonic acid in a component composed of the dimethylnaphthalene formaldehyde resin, the phenols and p-toluenesulfonic acid is preferably from 0.0001 to 0.5% by mass, and more preferably from 0.01 to 0.2% by mass. When the concentration of p-toluenesulfonic acid is made to fall within the foregoing range, a preferable reaction rate is obtainable, and it is possible to prevent an increase of the viscosity of the resin to be caused due to a large reaction rate.

Though a reaction time is not particularly limited, in general, it is preferably from about 2 to 6 hours. When the reaction time falls within this range, it is possible to produce the phenols-modified dimethylnaphthalene formaldehyde resin economically and industrially advantageously.

After completion of the condensation reaction, if desired, by after adding a diluting solvent, allowing the mixture to stand to cause two-phase separation, separating a resin phase as an oily phase from an aqueous phase, further washing the resin phase with water, thereby completely removing the catalyst and removing the added diluting solvent and the unreacted phenols by a general method such as distillation, etc., a phenols-modified dimethylnaphthalene formaldehyde resin is obtainable.

(Characteristic Values of Phenols-Modified Dimethylnaphthalene Formaldehyde Resin)

A weight average molecular weight (Mw) of the thus obtained polyfunctional dimethylnaphthalene formaldehyde resin is preferably from 300 to 6,000, more preferably from 500 to 1,300, and further preferably from 800 to 1,200; and a degree of dispersion (Mw/Mn) is preferably from 1.1 to 3, more preferably from 1.1 to 2.5, and further preferably from 1.1 to 2. Also, each of a content of a sulfur atom and a content of a nitrogen atom in the phenols-modified dimethylnaphthalene formaldehyde resin is not more than 0.5 ppm.

By using the phenols-modified dimethylnaphthalene formaldehyde resin for, for example, an electrical insulating material, a resin for resist, a semiconductor sealing resin, an adhesive for printed wiring board, a matrix resin for electrical laminate or prepreg to be mounted in electrical instruments, electronic instruments, industrial instruments, etc., a buildup laminate material, a resin for fiber-reinforced plastic, a sealing resin for liquid crystal display panel, a paint, a variety of coating agents, an adhesive and the like, it is possible to provide the product with a performance such as flame retardancy, heat resistance, etc.

EXAMPLES

The present invention is hereunder described in more detail with reference to the following Examples, but it should not be construed that the present invention is limited to these Examples.

In each of the Examples, the measurements of a mean value of the number of substituted hydrogen atoms per one naphthalene ring, a molecular weight, a content of nitrogen atom and a content of sulfur atom were carried out in the following manners.

(Mean Value of the Number of Substituted Hydrogen Atoms Per One Naphthalene Ring)

$^1$H-NMR apparatus: Model JNM-AL400 (400 MHz) (manufactured by JEOL Ltd.)

Solvent: $CDCl_3$ (Deutero chloroform)

Internal standard material: Tetramethylsilane

Calculation method of mean value of the number of substituted hydrogen atoms:

The resin was dissolved in the foregoing solvent, and the solution was subjected to $^1$H-NMR measurement. When an integrated value of methyl protons of a dimethylnaphthalene structure in the vicinity of from 2.3 to 3.2 ppm was defined as 6 which is the number of methyl protons, an integrated value of protons directly bonded on the naphthalene ring in the vicinity of from 6.8 to 8.2 ppm was calculated; and a value obtained by subtracting the thus calculated value from 6 which is the number of hydrogen atoms directly bonded on the naphthalene ring of the dimethylnaphthalene structure was defined as a mean value of the number of hydrogen atoms substituted by a reaction for producing a naphthalene formaldehyde resin among the six hydrogen atoms directly bonded on the naphthalene ring (mean value of the number of substituted hydrogen atoms per one naphthalene ring).

(Molecular Weight)

—Gel Permeation Chromatography (GPC) Measurement—

Apparatus: Model Shodex GPC-101 (manufactured by Showa Denko K.K.)

Column: LF-804×3

Eluent: THF 1 mL/min

Temperature: 40° C.

(Content of Nitrogen Atom)

Apparatus: Total nitrogen analyzer "Model TN-100" (manufactured by Mitsubishi Chemical Corporation)

Measurement Method:

The resin was dissolved in xylene, and the solution was then measured by the foregoing apparatus. A detection lower limit is 0.5 ppm.

(Content of Sulfur Atom)

Apparatus: Ion chromatogram "Model DX-500" (manufactured by DIONEX)

Measurement Method:

The resin was dissolved in xylene, and the solution was subjected to a combustion treatment (absorption into a hydrogen peroxide aqueous solution) by an oxy-hydrogen combustion apparatus (Model TSN-L, manufactured by Tokaseiki Co., Ltd.) and then measured by the foregoing apparatus. A detection lower limit is 0.5 ppm.

Production Example 1

Production of 1,5-dimethylnaphthalene

Step A:

1,000 g of o-xylene and 70 g of 1,3-butadiene were allowed to react with each other in the presence of a zirconium oxide based catalyst at 150° C. and at atmospheric pressure; after completion of the reaction, the reaction mixture was allowed to stand; and an upper layer was taken out. The foregoing zirconium oxide based catalyst was prepared in the following manner. Namely, 30 g of a zirconium oxide powder was added to an aqueous solution containing 5 g of potassium hydroxide and impregnated under stirring at 50° C. for one hour; subsequently, water was distilled off in vacuo at 70° C.; and the residue was dried at 115° C. overnight and then baked in air at 500° C. 10 g of the thus obtained catalyst was stirred at 180° C. in a nitrogen atmosphere, and after adding 0.5 g of metallic sodium, the mixture was stirred at the same temperature for 60 minutes, thereby preparing the zirconium oxide based catalyst.

Step B:

The upper layer was allowed to react at 170° C. and at atmospheric pressure in the presence of an H type mordenite catalyst having a silica/alumina ratio of 15 (HSZ-600HOA, manufactured by Tosoh Corporation).

Step C:

Subsequently, the reaction mixture obtained in the foregoing step B was allowed to react at 280° C. in the presence of a 1% by mass platinum/active carbon catalyst.

The thus obtained reaction mixed solution was cooled, and a deposited crystal was filtered, washed and then dried to obtain 1,5-dimethylnaphthalene (purity: 99.5% or more, content of sulfur atom and content of nitrogen atom: not more than 0.5 ppm each).

Production Example 2

Production of 2,6-dimethylnaphthalene 1,5-Dimethylnaphthalene obtained in Production Example 1 was isomerized at 250° C. using ZEOLITE "390HUA" (manufactured by Tosoh Corporation), thereby obtaining 2,6-dimethylnaphthalene (purity: 99.5% or more, content of sulfur atom and content of nitrogen atom: not more than 0.5 ppm each).

Example 1

In a bottom-removal separable flask having an internal volume of one liter and equipped with a Dimroth condenser, a thermometer and a stirring blade, 109.2 g (0.7 moles) of 1,5-dimethylnaphthalene (manufactured by Mitsubishi Gas Chemical Company, Inc.) obtained in Production Example 1, 210.0 g (2.8 moles as formaldehyde) of a 40% by mass formalin aqueous solution (manufactured by Mitsubishi Gas Chemical Company, Inc.) and 92.6 g of 98% by mass sulfuric acid (manufactured by Kanto Chemical Co., Inc.) were charged, and the mixture was stirred and allowed to react in a nitrogen gas stream at atmospheric pressure while refluxing at 100° C. After reacting for 7 hours, 180 g of ethylbenzene was added as a diluting solvent, and after allowing the mixture to stand, an aqueous phase as a lower phase was removed. Furthermore, after neutralization and washing with water, the ethylbenzene and unreacted 1,5-dimethylnaphthalene were distilled off in vacuo, thereby obtaining 120 g of a 1,5-dimethylnaphthalene formaldehyde resin which is a solid at ordinary temperature.

The obtained resin had a mean value of the number of substituted hydrogen atoms per one naphthalene ring of 2.6. Also, as a result of the GPC measurement, the resin had Mn of 552, Mw of 1,121 and Mw/Mn of 2.03. Furthermore, each of the content of sulfur atom and the content of nitrogen atom was not more than 0.5 ppm. The reaction condition and physical properties of the obtained resin are shown in Table 1.

Examples 2 to 5

The experiment was carried out in the same manner as in Example 1, except that in Example 1, the condition was changed as shown in Table 1, thereby obtaining a 1,5-dimethylnaphthalene formaldehyde resin which is a solid at ordinary temperature, respectively. The reaction condition and physical properties of the obtained resin are shown in Table 1.

TABLE 1

| | Example 1 | Example 2 | Example 3 | Example 4 | Example 5 |
|---|---|---|---|---|---|
| Charging (g) | | | | | |
| 1,5-Dimethylnaphthalene | 109.2 | 109.2 | 109.2 | 109.2 | 109.2 |
| 40% by mass formalin | 210.0 | 105.0 | 157.5 | 236.3 | 315.0 |
| 98% by mass sulfuric acid | 92.6 | 36.0 | 69.5 | 104.2 | 138.9 |
| Charging molar ratio HCHO*[1]/1,5-DMN*[2] | 4.0 | 2.0 | 3.0 | 4.5 | 6.0 |
| Concentration of sulfuric acid*[3] (% by mass) | 30 | 25 | 30 | 30 | 30 |
| Reaction temperature (° C.) | 100 | 100 | 100 | 100 | 100 |
| Reaction time (hours) | 7 | 5 | 5 | 7 | 7 |
| Acquisition amount of resin (g) | 120 | 41 | 95 | 122 | 127 |
| Yield of resin*[4] (% by mass) | 110 | 38 | 87 | 112 | 116 |
| Mean value of the number of substituted hydrogen atoms | 2.6 | 3.2 | 2.8 | 3.0 | 3.1 |
| Weight average molecular weight (Mw) | 1121 | 876 | 992 | 1152 | 1647 |
| Degree of dispersion (Mw/Mn) | 2.03 | 1.78 | 1.89 | 2.05 | 2.60 |
| Content of sulfur atom in the resin (ppm) | ≤0.5 | ≤0.5 | ≤0.5 | ≤0.5 | ≤0.5 |
| Content of nitrogen atom in the resin (ppm) | ≤0.5 | ≤0.5 | ≤0.5 | ≤0.5 | ≤0.5 |

The notes in Table 1 are as follows.
*[1]Formaldehyde
*[2]Dimethylnaphthalene
*[3]Concentration of sulfuric acid in a component composed of formaldehyde, water and sulfuric acid
*[4]Yield of the obtained resin based on charged 1,5-dimethylnaphthalene Example 6

In a bottom-removal separable flask having an internal volume of one liter and equipped with a Dimroth condenser, a thermometer and a stirring blade, 109.2 g (0.7 moles) of 2,6-dimethylnaphthalene (manufactured by Mitsubishi Gas Chemical Company, Inc.) obtained in Production Example 2, 210.0 g (2.8 moles as formaldehyde) of a 40% by mass formalin aqueous solution (manufactured by Mitsubishi Gas Chemical Company, Inc.), 92.6 g of 98% by mass sulfuric acid (manufactured by Kanto Chemical Co., Inc.) and 240 g of ethylbenzene were charged, and the mixture was stirred and allowed to react in a nitrogen gas stream at atmospheric pressure while refluxing at 100° C. After reacting for 7 hours, the reaction mixture was allowed to stand, and an aqueous phase as a lower phase was removed. Furthermore, after neutralization and washing with water, the ethylbenzene used as a solvent and unreacted 2,6-dimethylnaphthalene were distilled off in vacuo, thereby obtaining 110 g of a 2,6-dimethylnaphthalene formaldehyde resin which is a solid at ordinary temperature. The reaction condition and physical properties of the obtained resin are shown in Table 2.

Comparative Example 1

In a bottom-removal separable flask having an internal volume of one liter and equipped with a Dimroth condenser, a thermometer and a stirring blade, 142.2 g (1.0 mole) of 1-methylnaphthalene (manufactured by Wako Chemical Industries, Ltd., content of sulfur atom: 2,200 ppm, content of nitrogen atom: 3.9 ppm), 150.0 g (2.0 moles as formaldehyde) of a 40% by mass formalin aqueous solution (manufactured by Mitsubishi Gas Chemical Company, Inc.) and 51.4 g of 98% by mass sulfuric acid (manufactured by Kanto Chemical Co., Inc.) were charged, and the mixture was stirred and allowed to react in a nitrogen gas stream at atmospheric pressure while refluxing at 100° C. After reacting for 5 hours, 160 g of ethylbenzene was added, and after allowing the mixture to stand, an aqueous phase as a lower phase was removed. Furthermore, after neutralization and washing with water, the ethylbenzene used as a diluting solvent and unreacted 1-methylnaphthalene were distilled off in vacuo, thereby obtaining 150 g of a 1-methylnaphthalene formaldehyde resin which is a viscous liquid at ordinary temperature. The reaction condition and physical properties of the obtained resin are shown in Table 2.

Example 7

The experiment was carried out in the same manner as in Example 6, except that in Example 6, 1,5-dimethylnaphthalene obtained in Production Example 2 was used in place of the 2,6-dimethylnaphthalene and that methanol was added, thereby obtaining 100 g of a 1,5-dimethylnaphthalene formaldehyde resin which is a viscous liquid at ordinary temperature. The reaction condition and physical properties of the obtained resin are shown in Table 2.

Comparative Example 2

The experiment was carried out in the same manner as in Example 6, except that in Example 6, 1,4-dimethylnaphthalene (manufactured by Wako Chemical Industries, Ltd., content of sulfur atom: 1,700 ppm, content of nitrogen atom: 3.1 ppm) was used in place of the 2,6-dimethylnaphthalene, thereby obtaining 85 g of a 1,4-dimethylnaphthalene formaldehyde resin which is a viscous liquid at ordinary temperature. The reaction condition and physical properties of the obtained resin are shown in Table 2.

TABLE 2

|  | Example 6 | Comparative Example 1 | Example 7 | Comparative Example 2 |
| --- | --- | --- | --- | --- |
| Charging (g) | | | | |
| 1,5-Dimethylnaphthalene |  |  | 109.2 |  |
| 2,6-Dimethylnaphthalene | 109.2 |  |  |  |
| 1,4-Dimethylnaphthalene |  |  |  | 109.2 |
| 1-Methylnaphthalene |  | 142.2 |  |  |
| 40% by mass formalin | 210.0 | 150.0 | 210.0 | 210.0 |
| 98% by mass sulfuric acid | 92.6 | 51.4 | 117.0 | 92.6 |
| Methanol |  |  | 44.8 |  |
| Charging molar ratio | | | | |
| HCHO*1/1,5-DMN*2 |  |  | 4.0 |  |
| HCHO*1/2,6-DMN*2 | 4.0 |  |  |  |
| HCHO*1/1,4-DMN*2 |  |  |  | 4.0 |
| HCHO*1/1-MN*3 |  | 2.0 |  |  |
| Concentration of sulfuric acid*4 (% by mass) | 30 | 25 | 30 | 30 |
| Reaction temperature (° C.) | 100 | 100 | 85 to 90 | 100 |
| Reaction time (hours) | 7 | 5 | 7 | 7 |
| Acquisition amount of resin (g) | 110 | 150 | 100 | 85 |
| Yield of resin*5 (% by mass) | 100 | 105 | 91 | 78 |
| Mean value of the number of substituted hydrogen atoms | 3.3 | 1.4 | 2.6 | 1.1 |
| Weight average molecular weight (Mw) | 1457 | 405 | 451 | 180 |
| Degree of dispersion (Mw/Mn) | 2.46 | 1.07 | 1.28 | 1.07 |
| Content of sulfur atom in the resin (ppm) | ≤0.5 | 1700.0 | ≤0.5 | 1500.0 |
| Content of nitrogen atom in the resin (ppm) | ≤0.5 | 2.0 | ≤0.5 | 2.6 |

The notes in Table 2 are as follows.
*1Formaldehyde
*2Dimethylnaphthalene
*3Methylnaphthalene
*4Concentration of sulfuric acid in a component composed of formaldehyde, water and sulfuric acid
*5Yield of the obtained resin based on the charged dimethylnaphthalene or methylnaphthalene

Example 8

In a four-necked flask having an internal volume of 500 mL and equipped with a Dimroth condenser, a thermometer and a stirring blade, 90 g of 1,5-dimethylnaphthalene formaldehyde resin obtained in Example 1, 94.1 g of phenol and 0.36 g of p-toluenesulfonic acid were added in a nitrogen gas stream, the temperature was elevated to 185° C., and the mixture was allowed to react for 4 hours. After diluting by the addition of ethylbenzene, neutralization and washing with water were carried out, and the solvent and unreacted phenol were removed in vacuo, thereby obtaining 130 g of a phenol-modified 1,5-dimethylnaphthalene formaldehyde resin.

As a result of the gel permeation chromatography (GPC) measurement, the resin had Mn of 678, Mw of 1,130 and Mw/Mn of 1.66 and also had a hydroxyl group value of 253 mg-KOH/g. The reaction condition and physical properties of the obtained resin are shown in Table 3.

Comparative Example 3

The experiment was carried out in the same manner as in Example 8, except that in Example 8, the 1-methylnaphthalene formaldehyde resin obtained in Comparative Example 1 was used in place of the 1,5-dimethylnaphthalene formaldehyde resin obtained in Example 1, thereby obtaining 105 g of a phenol-modified 1-methylnaphthalene formaldehyde resin.

As a result of the gel permeation chromatography (GPC) measurement, the resin had Mn of 397, Mw of 642 and Mw/Mn of 1.62 and also had a hydroxyl group value of 216 mg-KOH/g. The reaction condition and physical properties of the obtained resin are shown in Table 3.

Example 9

The experiment was carried out in the same manner as in Example 8, except that in Example 8, the 2,6-dimethylnaphthalene formaldehyde resin obtained in Example 6 was used in place of the 1,5-dimethylnaphthalene formaldehyde resin obtained in Example 1, thereby obtaining 130 g of a phenol-modified 2,6-dimethylnaphthalene formaldehyde resin.

As a result of the gel permeation chromatography (GPC) measurement, the resin had Mn of 632, Mw of 1,045 and Mw/Mn of 1.65 and also had a hydroxyl group value of 262 mg-KOH/g. The reaction condition and physical properties of the obtained resin are shown in Table 3.

Comparative Example 4

The experiment was carried out in the same manner as in Example 8, except that in Example 8, the 1,4-dimethylnaphthalene formaldehyde resin obtained in Comparative Example 2 was used in place of the 1,5-dimethylnaphthalene formaldehyde resin obtained in Example 1, thereby obtaining 95 g of a phenol-modified 1,4-dimethylnaphthalene formaldehyde resin.

As a result of the gel permeation chromatography (GPC) measurement, the resin had Mn of 357, Mw of 532 and Mw/Mn of 1.49 and also had a hydroxyl group value of 191 mg-KOH/g. The reaction condition and physical properties of the obtained resin are shown in Table 3.

INDUSTRIAL APPLICABILITY

The polyfunctional dimethylnaphthalene formaldehyde resin of the present invention can be utilized for widespread applications such as an electrical insulating material, a resin for resist, a semiconductor sealing resin, an adhesive for printed wiring board, a matrix resin for electrical laminate or prepreg to be mounted in electrical instruments, electronic instruments, industrial instruments, etc., a buildup laminate material, a resin for fiber-reinforced plastic, a sealing resin for liquid crystal display panel, a paint, a variety of coating agents, an adhesive and the like upon being modified with phenols such as phenol, naphthol, etc., polyols or carboxylic acids.

The invention claimed is:

1. A polyfunctional dimethylnaphthalene formaldehyde resin obtained by allowing
   (1) at least one dimethylnaphthalene having one methyl group on each of two benzene rings in a naphthalene ring thereof and selected from the group consisting of 1,5-dimethylnaphthalene, 1,6-dimethylnaphthalene, 1,7-dimethylnaphthalene, 1,8-dimethylnaphthalene and 2,7-dimethylnaphthalene; and
   (2) formaldehyde
   to react with each other in the presence of water and an acid catalyst,
   the polyfunctional dimethylnaphthalene formaldehyde resin having a mean value of the number of hydrogen atoms substituted by the reaction among the six hydrogen atoms directly bonded on the naphthalene ring in the dimethylnaphthalene of from 1.8 to 3.5.

2. The polyfunctional dimethylnaphthalene formaldehyde resin according to claim 1, wherein a use proportion of the components (1) and (2) [component (1)/component (2)] is from 1/1 to 1/6 in terms of a molar ratio.

3. The polyfunctional dimethylnaphthalene formaldehyde resin according to claim 1, wherein the acid catalyst is sulfuric acid or p-toluenesulfonic acid.

4. The polyfunctional dimethylnaphthalene formaldehyde resin according to claim 3, wherein the acid catalyst is sulfu-

TABLE 3

| | Example 8 | Comparative Example 3 | Example 9 | Comparative Example 4 |
|---|---|---|---|---|
| Charging (g) | | | | |
| Resin obtained in Example 1 | 90 | | | |
| Resin obtained in Comparative Example 1 | | 90 | | |
| Resin obtained in Example 6 | | | 90 | |
| Resin obtained in Comparative Example 2 | | | | 90 |
| Phenol | 94 | 94 | 94 | 94 |
| 5% p-toluenesulfonic acid aqueous solution | 2.4 | 2.4 | 2.4 | 2.4 |
| Reaction temperature (° C.) | 185 | 185 | 185 | 185 |
| Reaction time (hours) | 4 | 4 | 4 | 4 |
| Acquisition amount of modified resin (g) | 130 | 100 | 130 | 95 |
| Yield of modified resin*[1] (% by mass) | 144 | 111 | 144 | 106 |
| Weight average molecular weight (Mw) | 1130 | 642 | 1045 | 532 |
| Degree of dispersion (Mw/Mn) | 1.66 | 1.62 | 1.65 | 1.49 |
| Content of sulfur atom in the modified resin (ppm) | ≤0.5 | 1600.0 | ≤0.5 | 1500.0 |
| Content of nitrogen atom in the modified resin (ppm) | ≤0.5 | 1.9 | ≤0.5 | 2.3 |

The note in Table 3 is as follows.
*[1]Yield of the obtained phenol-modified resin based on the charged resin ric acid, and the concentration of sulfuric acid in a component composed of formaldehyde, water and sulfuric acid is from 20 to 55% by mass.

5. The polyfunctional dimethylnaphthalene formaldehyde resin according to claim 1, wherein the concentration of formaldehyde in a component composed of formaldehyde, water and the acid catalyst is from 20 to 40% by mass.

6. The polyfunctional dimethylnaphthalene formaldehyde resin according to claim 1, obtained by further adding an aliphatic alcohol and allowing it to react in the reaction of the dimethylnaphthalene and formaldehyde.

7. The polyfunctional dimethylnaphthalene formaldehyde resin according to claim 6, wherein the aliphatic alcohol is methanol, ethanol or isopropanol.

8. The polyfunctional dimethylnaphthalene formaldehyde resin according to claim 1, wherein the content of a nitrogen atom derived from impurities which are incorporated into the dimethylnaphthalene in the resin is not more than 0.5 ppm.

9. The polyfunctional dimethylnaphthalene formaldehyde resin according to claim 1, having a weight average molecular weight (Mw) of from 200 to 2,000.

10. A phenols-modified dimethylnaphthalene formaldehyde resin obtained by allowing phenols and the polyfunctional dimethylnaphthalene formaldehyde resin according to claim 1 to react with each other.

11. The phenols-modified dimethylnaphthalene formaldehyde resin according to claim 10, having a weight average molecular weight (Mw) of from 300 to 6,000.

12. A method for producing a polyfunctional dimethylnaphthalene formaldehyde resin comprising
(I) obtaining at least one dimethylnaphthalene selected from the group consisting of 1,5-dimethylnaphthalene, 1,6-dimethylnaphthalene, 1,7- dimethylnaphthalene, 1,8-dimethylnaphthalene and 2,7-dimethylnaphthalene through a chemical synthesis including (A) allowing 1,3-butadiene and o-xylene or p-xylene to react with each other in the presence of a strong alkali catalyst, (B) subsequently cyclizing the reaction product to obtain a tetralin compound and (C) dehydrogenating the tetralin compound to obtain a naphthalene compound, or a chemical synthesis further including (D) isomerizing the naphthalene compound obtained in (C); and
(II) allowing the dimethylnaphthalene obtained in (I) and formaldehyde to react with each other in the presence of water and an acid catalyst,
the polyfunctional dimethylnaphthalene formaldehyde resin having a mean value of the number of hydrogen atoms substituted by the reaction among the six hydrogen atoms directly bonded on the naphthalene ring in the dimethylnaphthalene of from 1.8 to 3.5.

13. The polyfunctional dimethylnaphthalene formaldehyde resin according to claim 1, wherein said mean value is from 2.0 to 3.5.

14. The polyfunctional dimethylnaphthalene formaldehyde resin according to claim 1, wherein said mean value is from 2.0 to 3.3.

15. The polyfunctional dimethylnaphthalene formaldehyde resin according to claim 1, wherein said mean value is from 2.5 to 3.0.

16. The polyfunctional dimethylnaphthalene formaldehyde resin according to claim 1, having a weight average molecular weight (Mw) of from 300 to 1,800.

17. The polyfunctional dimethylnaphthalene formaldehyde resin according to claim 1, having a weight average molecular weight (Mw) of from 300 to 1,700.

18. The polyfunctional dimethylnaphthalene formaldehyde resin according to claim 1, having a degree of dispersion (Mw/Mn) of 1.1 to 3.

19. The polyfunctional dimethylnaphthalene formaldehyde resin according to claim 1, having a degree of dispersion (Mw/Mn) of 1.1 to 2.8.

20. The polyfunctional dimethylnaphthalene formaldehyde resin according to claim 1, which is obtained from 1,5-dimethylnaphthalene.

21. The polyfunctional dimethylnaphthalene formaldehyde resin according to claim 1, wherein said mean value is 2.6 to 3.5.

22. The polyfunctional dimethylnaphthalene formaldehyde resin according to claim 1, wherein said mean value is 2.8 to 3.5.

* * * * *